(No Model.)  6 Sheets—Sheet 2.

G. A. ANNETT.
SEWING MACHINE.

No. 386,445.  Patented July 24, 1888.

(No Model.) 6 Sheets—Sheet 3.

G. A. ANNETT.
SEWING MACHINE.

No. 386,445. Patented July 24, 1888.

Witnesses

Inventor,
Geo. A. Annett
By his Attorney (No Model.) 6 Sheets—Sheet 6.

G. A. ANNETT.
SEWING MACHINE.

No. 386,445. Patented July 24, 1888.

Witnesses.
Inventor,
By his Attorney

UNITED STATES PATENT OFFICE.

GEORGE A. ANNETT, OF SUTHERLAND'S CORNERS, ONTARIO, CANADA.

SEWING-MACHINE.

SPECIFICATION forming part of Letters Patent No. 386,445, dated July 24, 1888.

Application filed April 9, 1887. Serial No. 234,280. (No model.)

*To all whom it may concern:*

Be it known that I, GEORGE A. ANNETT, residing at Sutherland's Corners, in the Province of Ontario and Dominion of Canada, have invented certain new and useful Improvements in Sewing-Machines, of which the following is a specification, reference being had therein to the accompanying drawings.

My invention relates to that class of sewing-machines having a main rotary shaft in the upper part of the bracket-arm, a secondary rotary shaft beneath the bed-plate, and a rotary shuttle driven by the latter shaft, and the object thereof is to provide a sewing-machine of the class referred to which will run smoothly and easily, and which will be entirely reliable in operation, so that there will be no danger of skipping stitches, In the accompanying drawings.

A denotes the bed-plate of the machine, and A' the bracket-arm, and in the horizontal upper portion of the latter is journaled the main or driving shaft B, having the usual pulley-wheel, B', and fly-wheel $B^2$. The standard or vertical portion of the bracket-arm is provided (as is usual) on its front sides with openings to permit of access to the mechanism within said arm, and I prefer to cover the said openings by a pivoted dust cap or plate, $a$, on which is mounted the bobbin-winder X. To prevent the said cap, when turned on its pivot pin or screw $a'$, from scratching the enamel of the standard, the hole for the reception of the said screw may be surrounded by a slightly-raised portion or washer, $a^2$, and to retain the said cap in position to cover the openings in the standard or to permit bobbins to be wound, small recesses or indentations $a^3$ may be formed in the said standard for the reception of the point of a pin or screw, $a^4$, the cap springing sufficiently as it is turned by its handle $a^5$ to permit the point of the said pin or screw $a^4$ to pass from one of the said recesses to the other.

Figures 1, 5:
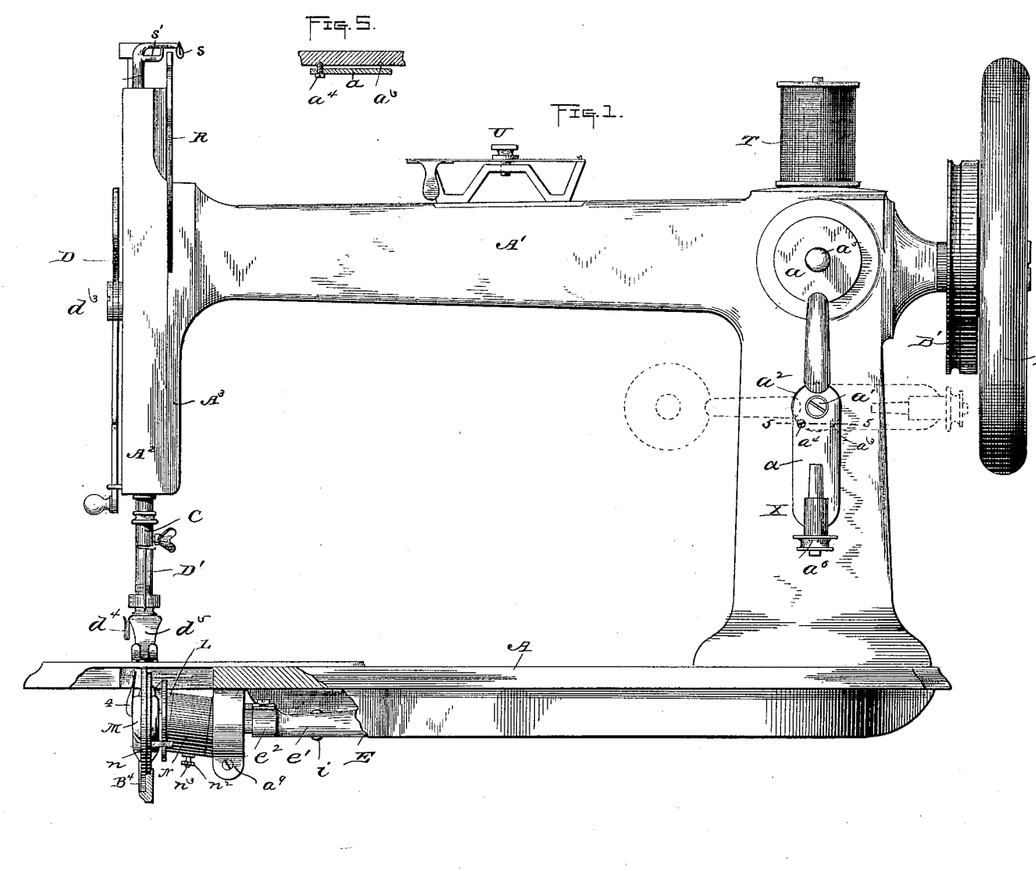
Figure 1 is a side elevation of my improved sewing-machine.
Fig. 5 is a detail section on line 5 5, Fig. 1.

When the cap $a$ is turned to the position shown in dotted lines in Fig. 1, the pulley $a^6$ of the bobbin-winder will be in a line with the driving-belt running to the pulley B', and will thus be in position to be driven by the said belt, the lower or outer flange of the said pulley $a^6$ being preferably smaller than the upper or inner flange thereof, so that the said pulley can easily pass under the belt.

I prefer to make the needle-bar C somewhat shorter than usual, so that it will not extend above the top of the cap or face plate $A^2$, the bearings for the said bar being in the present instance formed in bushings $c$, secured in place by suitable set-screws. To the needle-bar is attached a collar, $c'$, having a pin, $c^2$, which is connected by a link, $b$, with a crank-pin carried by the weighted or balanced crank-disk $b'$ at the forward end of the shaft B, an extension, R, of the said link forming the take-up, extending outward through a slot in the arm.

The operation of the take-up, in connection with the needle, shuttle, and the thread-guides on the post S, attached to the cap $A^2$, will be described hereinafter.

To steady the needle-bar and to take the side-thrust of the pin $c^2$, the said pin is provided with a block, $c^3$, guided in a groove, $a^8$, in the depending portion $A^3$, at the forward end of the arm A'.

Figures 2, 4:
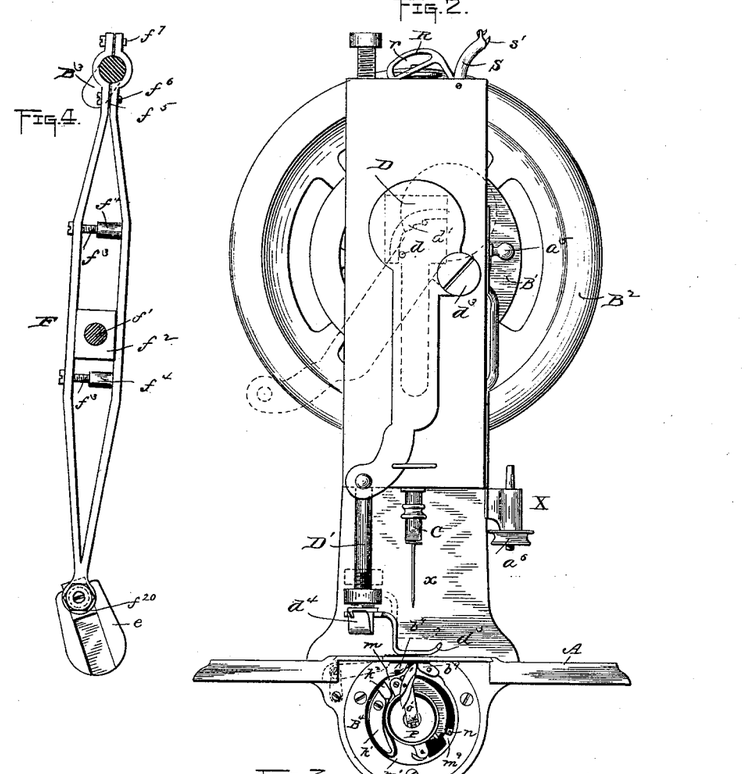
Fig. 2 is a front view thereof.
Fig. 4 illustrates the connection between the upper and lower shafts.
Figure 3:
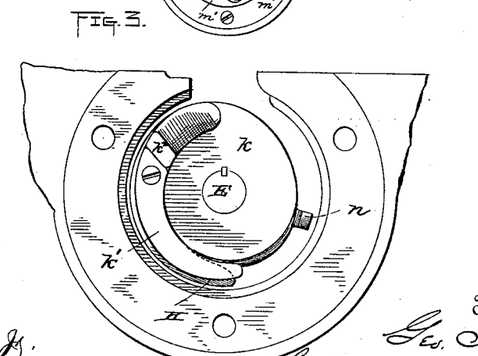
Fig. 3 is a detail front view of the shuttle-drivers and the shuttle-race.
Figures 6, 7:
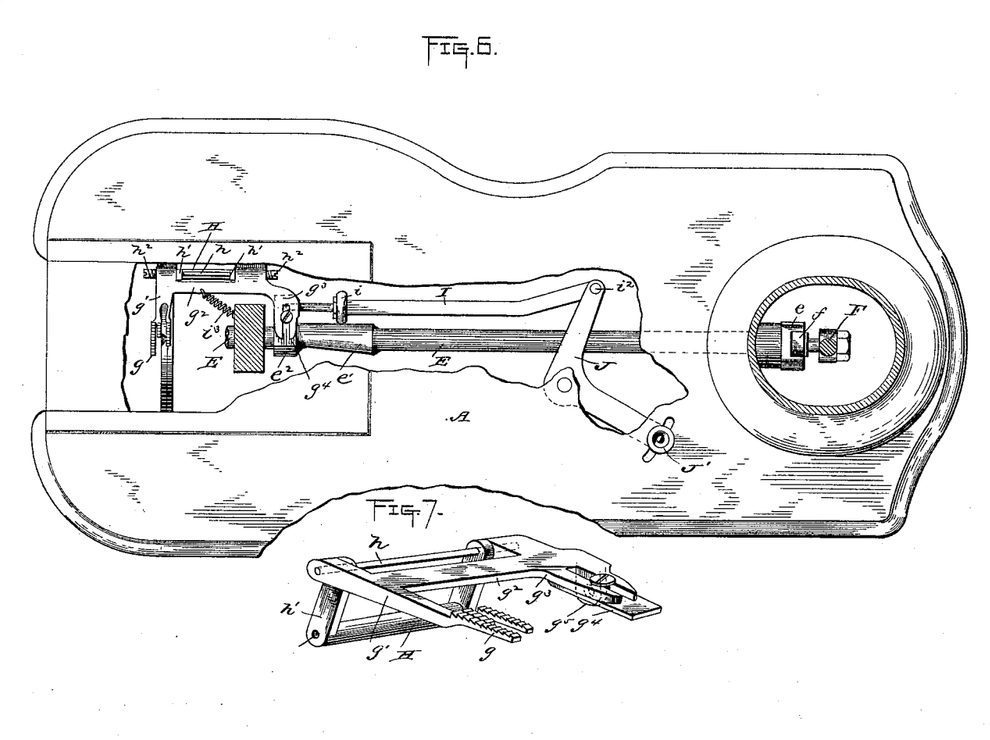
Fig. 6 is a broken-out plan view of the work-plate to show the feeding mechanism.
Fig. 7 is a detail perspective view further illustrating said mechanism.

To give access to the interior of the head without removing the face-plate $A^2$, the latter is preferably made with an opening in front, which is closed by a pivoted dust-cap, D. I utilize this dust-cap as a presser-foot lifter by providing the same with a pin, $d$, which engages a notched bar, $d'$, attached to the presser-bar D', and having an upward extension, $d^2$, guided vertically in the head. The cap D is pivoted on the screw $d^3$, and the bar $d'$ has preferably two notches, as shown in Fig. 2, to provide for two lifts, or for raising the presser-foot to different heights. A thread cutter and holder, $d^4$, is attached to the lower end of the presser-bar adjacent to the presser-foot $d^5$.

The connection between the main shaft B and the lower rotary shaft, E, is made by the pitman-lever F, the split upper end of which engages the crank $B^3$ of the shaft B, said lever having at its lower end a pin engaging a slide, $f$, movable in a grooved crank, $e$, on the shaft E. The fulcrum-pin $f'$ of the said pitman-lever is above the center of the said lever when the latter is in a medium position, or midway of its stroke, so that the pin or slide $f^{20}$ at the lower end thereof describes an elliptical path, moving in and out in the grooved crank $e$, thereby imparting a variable rotary movement to the shaft E from the uniformly-rotating shaft B in a well-known manner. The fulcrum-pin $f'$ is provided with a block, $f^2$, fitting the central portion of the said lever, so that the latter is guided by the said block; and to take up wear at this point I provide the screws $f^3$, which pass through one portion of the said lever and are tapped in lugs $f^4$ on the other portion thereof. To enable the upper end of the pitman-lever to be passed over the crank $B^3$, I saw or otherwise split the said end entirely through and fill the cut below the crank by a washer, $f^5$, through which passes the clamping-screw $f^6$, the split upper end being properly tightened to take up wear by the upper clamping-screw, $f^7$.

The lower shaft, E, is provided with a tapering cam, $e'$, and a feed-lifting cam, $e^2$, the said cams being formed integral with the said shaft, if desired. The feed-dog $g$ is attached to or formed on an arm or bar, $g'$, connected by a bar, $g^2$, with an arm, $g^3$, to which is adjustably attached a plate or shoe, $g^4$, resting on the cam $e^2$. For convenience of description, the parts $g'$, $g^2$, and $g^3$, which are or may be all formed in one piece, may be termed the "feed-bar." A pin, $h$, pivotally connects the arms $g'$ and $g^3$ to rigid vertical arms $h'$ of a feed-rocker, H, pivoted on center screws, $h^2$, tapped in suitable hangers on the bed-plate A. The arm $g^3$ has a depending lug at $g^5$, provided with a hole, into which enters the forward end of a bar, I, having a roller, $i$, bearing against the tapering cam $e'$, the rear end of the said arm being pivotally connected by a pin, $i^2$, to a feed-regulating lever, J, having a pin and an ordinary set-nut, J', above the work-plate. A retracting-spring, $i^3$, holds the shoe $g^4$ and roller $i$ in contact with their respective cams.

From the foregoing it will be apparent that as the shaft E revolves, the feed-dog will be moved back and forth horizontally, owing to the rocking movements which will be imparted to the rocker H from the cam $e'$ through the connections described, while the said dog will be lifted at the proper intervals by the cam $e^2$ acting on the feed-bar, the latter rocking on the pin $h$ as the said dog is raised and lowered, and the rocker H turning on its pivot-screws $h^2$ as the feed-bar is moved back and forth horizontally.

By changing the position of the feed-regulating lever H the roller $i$ will be caused to impinge against a portion of the cam $e'$ having a greater or less throw, and thus the movements of the feed-dog may be varied at pleasure.

The arm $g^3$ of the feed-bar might rest directly on the lifting-cam $e^2$; but I prefer to use the adjustable plate or shoe $g^4$, as the latter may be changed in position relative to the said arm $g^3$ when it becomes worn by contact with the said cam. The feed-dog is forked, so that one prong may drop on each side of the rim of the shuttle.

The shuttle-driving disk $k$ is attached to the forward end of the shaft E, and the main driver K, carried by the said disk, is preferably provided with the outwardly-extending thread-guard $k'$, to prevent the threads from interfering with the needle. The shuttle is carried around mainly by the contact of the forward end or horn, $k^2$, of the said driver with the heel $m$ of the shuttle; but at times, when loops of needle-thread are to pass the said heel, the latter is forced away from the horn $k^2$ by the supplemental driver $n$, carried by the inclined sleeve N, rotating on the inclined cylinder L, secured to the hanger $a^0$, which supports the forward end of the shaft E. The said sleeve N is connected with the disk $k$ by the arm $n'$, link $n^2$, and stud $n^3$ on the said sleeve. The connection between the link $n^2$ and the arm $n'$ and stud $n^3$ is preferably made by ball-joints, as shown, so as to afford a free movement of the parts with an adaptability to take up wear and thus prevent rattling noise. Owing to the inclined position of the sleeve N, the supplementary driver $n$ will be withdrawn from engagement with the shuttle when in the position shown in dotted lines in Fig. 16, but will engage the shuttle when in position shown in full lines in said figure. The inclined position of the sleeve N also causes a slight swinging motion of the link $n^2$ as the stud $n^3$ approaches or recedes from the disk $k$ in its revolution, and this swinging motion of the said link (resulting from the varying distance between the connected ends of the arm $n'$ and stud $n^3$) causes the rotary movement of the said sleeve to be a little faster and slower at intervals than the movement of the disk $k$ and of the main shuttle-driver carried thereby, the accelerated movement of the sleeve occurring when the driver $n$ is projected forward, as in full lines, Fig. 16, to engage the shuttle. From this it results that when the shuttle is in such position that its heel is about to pass through a loop of needle-thread the supplemental driver $n$ will engage the said shuttle, and as the said driver is at this moment going a little faster than the main driver, the movement of the shuttle will be accelerated slightly to force its heel out of contact with the horn $k^2$ of the said main driver, and thus open a space between the said driver and heel for the free passage of the needle thread. The point of the driver $n$ is preferably tapered, so that it has a slight wedge action on the shuttle as it is projected forward to engage the latter.

Figures 13, 14, 15, 16, 17, 18:
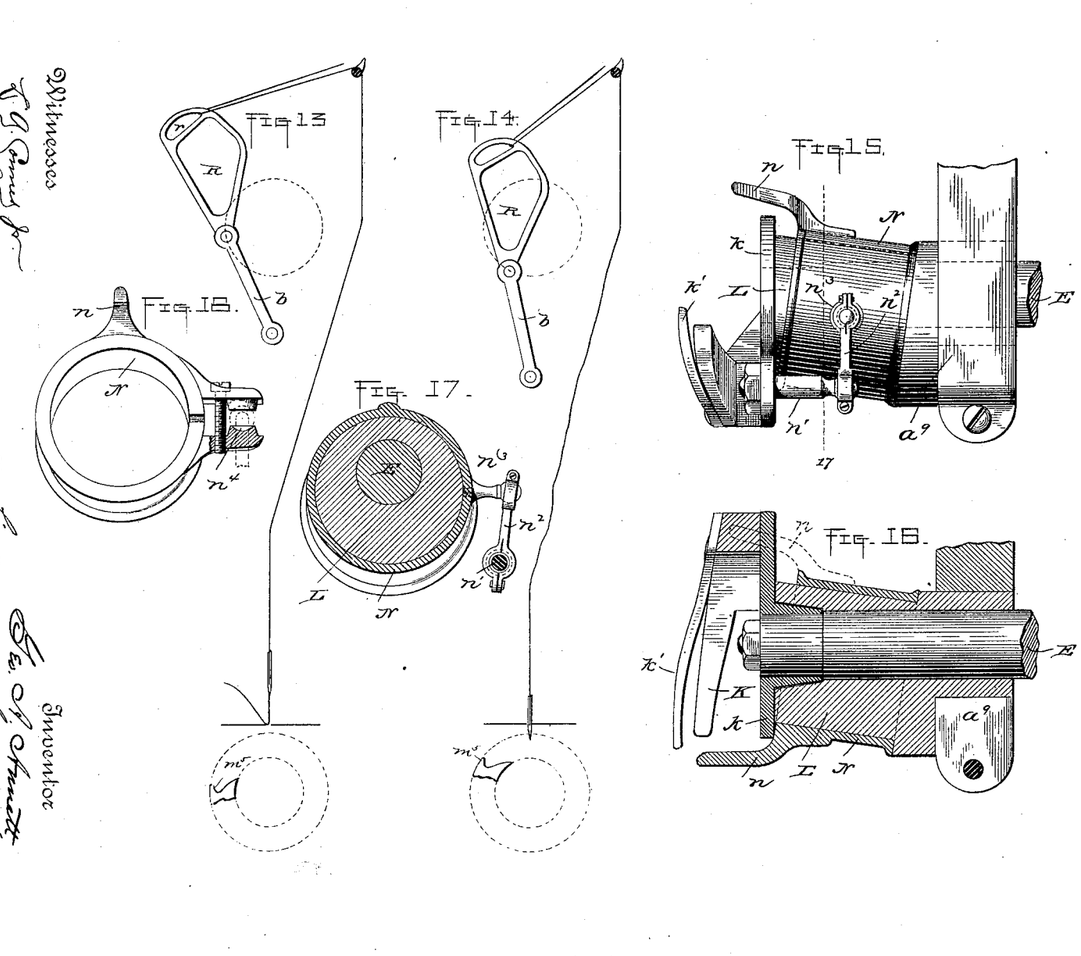
Figs. 15, 16, and 17 are enlarged detail views of the shuttle driving mechanism.
Fig. 18 illustrates a modification of a portion thereof.
Figure 19:
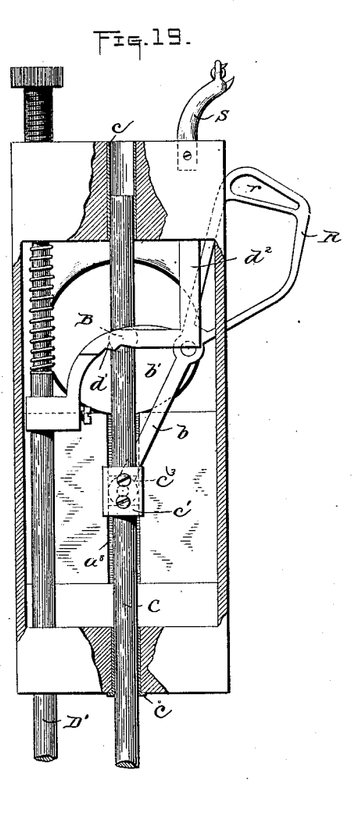
Fig. 19 is a front view of the head with the face-plate removed.

In the modification shown in Fig. 18 the sleeve N is split, so that it may be compressed to take up wear, and with this form of sleeve the link $n^2$ may have at its end a ball embraced by socketed lugs $n^4$ on the sleeve N.

Figures 20, 21, 22, 23, 24, 25, 26:
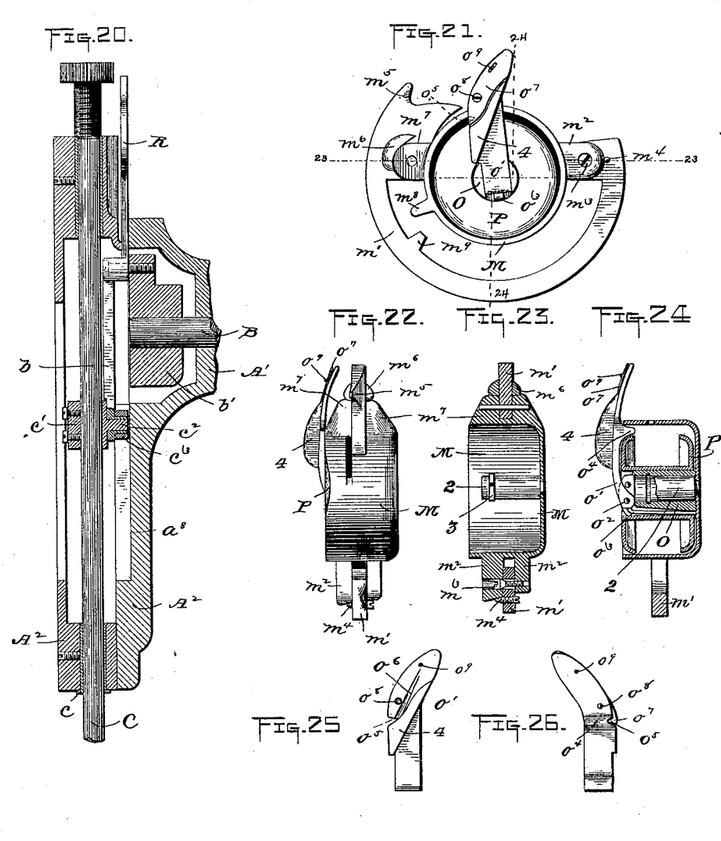
Fig. 20 is a central vertical section of the head and forward end of the bracket-arm.
Fig. 21 is an enlarged front view of the shuttle.
Fig. 22 is an edge view thereof.
Fig. 23 is a section of the shuttle, with the bobbin and tension device removed, on the line 23 23, Fig. 21.
Fig. 24 is a section on line 24 24, Fig. 21.
Fig. 25 is a detail front view of the body of the tension device with the tension-spring removed.
Fig. 26 is a detail rear view of the body of the tension device.

The shuttle, as herein shown, consists of a central body or bobbin-holding portion, M, and a rim, $m'$, connected with the body, preferably at two points only—one at the heel and the other near the back or point of the shuttle—the said rim having the outwardly-projecting lug $m^9$, against which the tapered or inclined point of the supplemental driver $n$ impinges when it is to accelerate the movement of the shuttle to make a free loop-passage between the heel of the shuttle and the horn $k^2$ of the main driver, as above described. Thus the shuttle is of skeleton form, and to compensate for the wear thereof in the race the said rim $m'$ (which is of spring metal) may be adjustably connected with the lugs $m^2$ of of the body M by the screws $m^3$ $m^4$, (see Fig. 23,) having conical portions, as shown. Thus, if the shuttle is a little loose in its race, the screw $m^3$ may be turned back slightly and the screw $m^4$ turned forward a little, so as to spring the rim $m'$ outward or expand the same to fill the race with a proper snugness; or, if the shuttle fits too snugly in the race, the rim may be contracted slightly by reversing these movements of the said screws. The skeleton shuttle, consisting of the rim and body portions, connected as above described, is very light and easily driven.

The loop seizing point $m^5$ of the shuttle is at the periphery of the rim $m'$, and as the latter is thin I prefer to provide it rearward of the said point with inclined projections $m^6$, which, in co-operation with the tapering lugs $m^7$ on the body M, facilitate the proper expansion of the loops of needle-thread and the passage of the shuttle through the said loops, and to further assist in this operation the said body is provided rearward of the lugs $m^7$ with a curved loop guide or expander, $m^8$, the highest portion of which is under the rim of the shuttle.

The body M, which forms the bobbin-case, has a central fixed pin or spindle, 2, having near its outer end an annular recess, in which is placed a small split ring, 3. Over the pin 2 fits a sleeve, O, having an interior annular recess, into which the ring 3 can expand slightly to retain the said sleeve on the said pin, the said sleeve supporting the shuttle tension device, the body $o'$ of which is hinged to said sleeve by the pin $o^2$, a small spring, $o^3$, seated or housed in the sleeve and bearing against the end of the said body $o'$, serving to hold the tension device in or out of operative position. Any other suitable friction device might be employed for retaining the sleeve O on the pin 2.

The hollow bobbin P fits on the sleeve O, and the tension device is of proper size to enable the said bobbin to pass over the same when it is to be inserted into or removed from the shuttle. When this is to be done, the hinged tension device is turned outward from its operative position on its hinge to a horizontal position, so as to be in line with the pin 2, and when returned to its operative position it will be held upright by the spring $o^3$, and in this position it will retain the bobbin in the shuttle, thus dispensing with a bobbin-case or other special bobbin-retaining device.

The body $o'$ of the tension device is preferably provided with a small inwardly-projecting lip, $o^4$, and with a thread-slot, $o^5$, from the inner end of which leads a thread-retaining groove, $o^6$, which decreases in depth upward, (see Fig. 25,) the bobbin-thread, as it is delivered, running in the said groove beneath the tension-spring $o^7$, and the latter being retained in place by the regulating-screw $o^8$ and the pin $o^9$, the pointed lower end of said spring slightly overlapping the slot $o^5$ to prevent the escape of the thread therefrom. The body $o'$ of the tension device is provided with the rounded or inclined rib or projection 4, which prevents the loops of needle thread from catching on the head of the tension-regulating screw $o^8$.

In threading the shuttle the bobbin-thread is drawn into the slot $o^5$ around the lower end of the tension-spring into the lower end of the groove $o^6$, and then upward beneath the said spring, and as the draft of the thread in being delivered is toward the left, (see Fig. 21,) the pin $o^9$, against which the thread will draw, will prevent the escape of the thread from beneath the upper end of the said spring. The slot $o^5$ is preferably placed so as to be a little below the upper edge of the outer flange of the bobbin, so that the thread running from the said slot will impinge against the said flange, (see Fig. 21,) and will thus prevent the bobbin from turning too freely on its supporting-sleeve O as the thread is drawn therefrom. Space for the lip $o^4$ between the bobbin-flange and the outer rim of the body M is provided by making the opening of the sleeve O for the reception of the pin 2 eccentric to said sleeve, the thicker portion of the sleeve being downward, thus bringing the bobbin eccentric to the shuttle. The small flange at the inner end of the sleeve O holds the bobbin out of contact with the interior of the shuttle. The upper end of the tension device rests in an opening between projections $b^9$ of the race-plate $B^4$, by which the shuttle is held in its race, so that the said device and its attached sleeve O are prevented from rotating with the shuttle.

Figure 8:
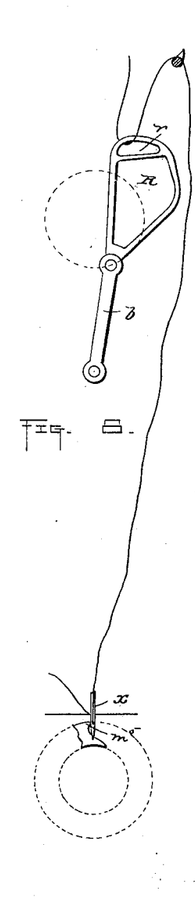
Figs. 8 to 14, inclusive, are diagrammatic views to illustrate the operation of the needle, shuttle, and take-up.
Figure 9:
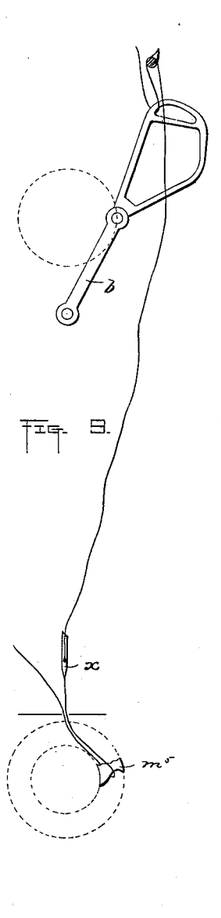
Figure 10:
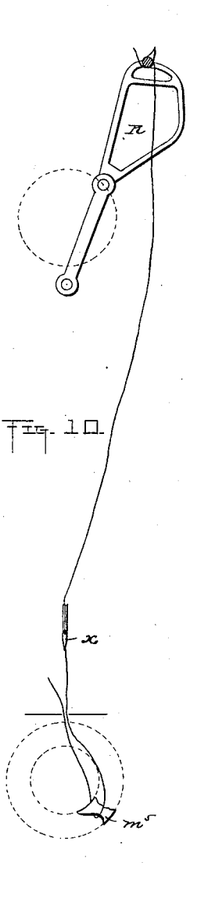
Figure 11:
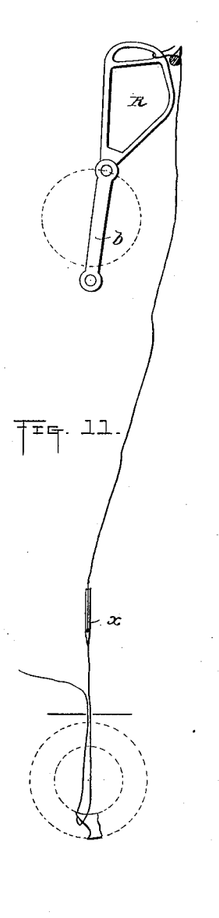

As hereinbefore stated, the take-up R is merely an extension of the needle-bar-operating link b, and as the said take-up partakes of the rotary movement of the crank-pin by which the said link is operated, the upper end of the take-up will be caused to travel in an elliptical path. The needle-thread passes from the spool T through the tension device U to the guide-eye s, supported by the post S, thence through the slotted eye r in the upper end of the take-up, thence over the wide thread support or guide s', and thence to the needle. The guide-eye s is curled inward or toward the take-up, as shown in Fig. 1, so as to throw the slack thread away from the take-up, and thus prevent the loop from overlapping. The slot r in the upper end of the take-up extends transversely of the machine or in the direction of the movement of the said take up, and thus permits of a certain amount of lost motion of the take-up relative to the thread to make a proper timing of the take up relative to the shuttle and needle. Fig. 8 shows the relative positions of the take-up and the point of the shuttle as the latter is about to seize a loop of thread from the needle x. As the loop is expanded by the shuttle, Figs. 9 and 10, the take-up is rising, so that the bight of thread running from the guides s and s' to the take-up is slackened or given up until the parts are in the positions indicated by Fig. 11, when the shuttle is a little more than half through the loop. Owing to the slotted eye r, the thread is not at all (or but slightly) acted on by the take-up while the latter is moving from the position shown in Fig. 10 to that shown in Fig. 11; but in moving from the position shown in the latter figure to that shown by Fig. 12 the take-up begins its pull on the thread, and as the shuttle (owing to the variable rotary movement of its operating-shaft E) is now moving more slowly than the crank-pin which operates the take-up, the latter has plenty of time to tighten the stitch and then to slacken the thread somewhat before the needle and shuttle are in position for the next loop to be taken.

Figure 12:
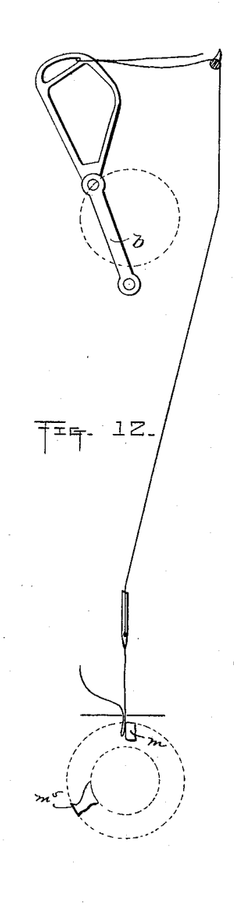

Figs. 12 and 13 illustrate the operation of tightening the stitch, and Fig. 14 shows the position of the take-up as the thread again begins to slacken.

The slotted eye r in the take-up serves an important office in securing an efficient action of the take-up operated from the needle-bar-operating crank pin and secures a proper operative timing of the rotary take-up in connection with the rotary shuttle. With the take-up thus constructed its operation of tightening a stitch is effected while its operating crank-pin is performing about one-third of a revolution, the take-up yielding up or slackening its thread during the remaining two-thirds of a revolution, and thus nicely meeting the requirements of the needle and co-operating rotary shuttle.

The wide thread support or guide s' permits the thread to spread to the left (see Fig. 1) as the take-up draws back in tightening the stitches, and thus the loop or bight of the thread held by the take-up is spread apart or opened, so that the limbs of the said loop will not get crossed and entangled with the take-up.

Having thus described my invention, I claim and desire to secure by Letters Patent—

1. The combination, with a stitch-forming mechanism comprising a needle and a rotary shuttle and operating mechanism therefor, of a rotary take up in the head of the sewing-machine and having a transversely elongated or slotted thread-eye to effect the proper timing of the take-up operation, and suitable thread guides or supports to co-operate with the said take-up.

2. The combination, with the needle-bar and its operating-link b, having the take-up extension R, provided with the elongated or slotted eye r, extending transversely of the machine, of the thread-guides s and s', the needle, and the rotary shuttle.

3. In a sewing machine, the combination, with the bracket-arm of a sewing-machine having one or more openings for access to the interior mechanism, of a pivoted dust-cap to cover the said opening or openings, said dust-cap being provided with a bobbin-winder.

4. The combination, with a rotary sewing-machine shuttle, of main and auxiliary drivers for the said shuttle and means for rotating the said auxiliary driver at a speed different from that of the main driver.

5. The combination, with the shuttle-driving shaft E, the shuttle, and the main driver for the latter carried by the said shaft, of the auxiliary driver n, the sleeve by which the latter driver is carried, the inclined cylinder on which the said sleeve is mounted, and connections between the said main driver and the said sleeve.

6. In a sewing-machine, the combination, with the upper and lower shafts thereof, of the pitman-lever split at its upper end, and thus adapted to be sprung over the crank of the upper shaft, and provided with clamping-screws above and below said crank, and a washer between the split below the crank, the said pitman-lever having also a central opening to receive the fulcrum pin or block, adjusting-screws on opposite sides of said pin or block, and lugs in which the said screws are tapped.

7. The combination, with the lower rotary shaft, E, having the tapering cam $e'$ and the feed-lifting cam $e^2$, of the feed-bar consisting of the three rigidly-connected parts $g'$ $g^2$ $g^3$, the pivoted feed-rocker H, having arms to which the said feed-bar is hinged, the bar I, engaging the feed-bar, and having a device, as roller i, impinging against said tapering cam, the feed-regulating lever pivotally attached to the said bar I, and a retracting-spring for the said feed-bar.

8. The combination, with the shaft E and the feed-lifting cam thereon, of the feed-bar having the arm $g^3$, provided with the horizontally-adjustable shoe or plate impinging against said cam, whereby the position of the said plate relative to the said cam may be varied as the plate becomes worn, as set forth.

9. The combination, with a rotary sewing-machine shuttle having a central bobbin-supporting pin provided with a friction device, as a split ring, of a sleeve fitting over said pin and having a recess into which said friction device or ring can spring, and a tension device which is hinged to said sleeve and the body of which is outside of the said shuttle, so as to retain the bobbin in the shuttle when the parts are in operative position.

10. A skeleton sewing-machine shuttle consisting of a central bobbin-holding portion or body and a segmental rim separate from, but attached to, said body at two points only and adjustable at one of its points of attachment, with an open space between the said body and the rim.

11. A skeleton sewing-machine shuttle consisting of a bobbin-holding portion or body and a segmental rim separate from but adjustably attached to said body.

12. The combination, with the shuttle-body portion M, having the lugs $m^2$, of the segmental rim $m'$ and the adjusting-screws $m^3 m^4$, having conical portions for expanding or contracting said rim.

13. The combination, with the shuttle-body M, having the tapering lugs $m^7$, of the rim $m'$, attached to the said body and having the loop-seizing point $m^5$ and the inclined projections $m^6$ rearward of said point.

14. The combination, with the rotary shuttle having the central pin, of the hollow bobbin within said shuttle, an eccentric sleeve fitting over said pin and within said bobbin, and a tension device outside the shuttle, hinged to said sleeve and having a thread slot slightly below the upper edge of the outer flange of the said bobbin.

15. The combination, with the shuttle, of the tension device consisting of the body portion $o'$, having the slot $o^5$, the thread-groove $o^6$, and the pin $o^9$, and the rib or projection 4, and the tension spring $o^7$ and its regulating-screw $o^8$.

16. The combination, with the bracket-arm A′, having at its forward end the depending portion $A^3$, provided with the groove $a^3$, of the shaft B, having at its forward end a crank-disk and crank pin, the needle-bar C, having the collar $c'$, provided with a pin, $c^2$, extending into said groove, and the link $b$, connecting the said pin with the said crank-pin, whereby as the needle-bar is reciprocated vertically the walls of the said groove will take the side-thrust on the said pin $c^2$, and thus steady the said needle-bar.

In testimony whereof I affix my signature in presence of two witnesses.

GEORGE A. ANNETT.

Witnesses:
FRED. R. JEFFERY,
W. R. HICKEY.